UNITED STATES PATENT OFFICE.

PETER VINSON, OF ELROD, INDIANA, ASSIGNOR OF ONE-HALF TO EBENEZER ELLIOTT, OF SAME PLACE.

COMBINED FERTILIZER AND INSECTICIDE.

SPECIFICATION forming part of Letters Patent No. 349,289, dated September 14, 1886.

Application filed April 5, 1886. Serial No. 197,903. (Specimens.)

*To all whom it may concern:*

Be it known that I, PETER VINSON, a citizen of the United States, residing at Elrod, in the county of Ripley and State of Indiana, have invented a new and useful Composition of Matter to be Used as a Protection to Planted Grain and as a Fertilizer therefor, as more fully hereinafter specified.

My improved composition consists of the following ingredients, combined in the following proportions, or thereabout, viz: cattle dung or excrement, fifty pounds; horse dung or excrement, thirty pounds; sheep dung or excrement, ten pounds; fowl dung or excrement, ten pounds; blue vitriol, (sulphate of copper,) two ounces; saltpeter, (nitrate of potash,) two ounces; slaked lime, twenty-five pounds; leached ashes, twenty-five pounds; Cayenne pepper, (capsicum,) pulverized, one ounce; black pepper, pulverized, one ounce; ginger, pulverized, one ounce; mustard-seed, one ounce; garlic, dried and pulverized, one-fourth of an ounce.

The ingredients, in the proportions above named and prepared as stated, are thoroughly mixed for use. The animal excrements are thoroughly dried, and ground separately from the other materials, and kept apart until ready for use, when the mixture of the whole is effected in any suitable manner, and the composition is placed in an ordinary drill and drilled with the grain to be dropped.

When prepared as described, the compound not only acts as a fertilizer to stimulate and support the vegetation after the grain has germinated, but acts as a protector of the grain by preventing the ravages of insects upon the same before and during the process of germination.

Having thus described my invention, what I claim, and desire to secure by Letters Patent, is—

The composition of matter herein described, and for the purposes named, the same consisting of the following ingredients, in about the proportions named, to wit: cattle dung or excrement, horse dung or excrement, sheep dung or excrement, fowl dung or excrement, blue vitriol, saltpeter, slaked lime, leached ashes, Cayenne pepper, black pepper, ginger, mustard-seed, and garlic, prepared and combined substantially in the manner specified.

PETER VINSON.

Witnesses:
REIGIN JOHNSON,
JOHN A. HACK.